Sept. 20, 1971  J. A. CUPLER II  3,605,228

COMPOUND ROTARY INPUT TOOL

Original Filed March 25, 1968

INVENTOR
JOHN A. CUPLER, II

BY Colton + Stone

ATTORNEYS

United States Patent Office 3,605,228
Patented Sept. 20, 1971

3,605,228
COMPOUND ROTARY INPUT TOOL
John A. Cupler II, 10 Cupler Drive, La Vale, Cumberland, Md. 21502
Original application Mar. 25, 1968, Ser. No. 715,711, now Patent No. 3,478,419, dated Nov. 18, 1969. Divided and this application Oct. 27, 1969, Ser. No. 869,733
Int. Cl. B24b 39/00
U.S. Cl. 29—90                                      2 Claims

ABSTRACT OF THE DISCLOSURE

The disclosure is directed to a jig boring and grinding tool having a compound rotary input.

---

This is a division of copending application Ser. No. 715,711 filed Mar. 25, 1968, now Pat. No. 3,478,419.

The invention is directed to an improved tool for use in boring, grinding or burnishing operations which is herein described as a burnishing tool wherein a rotating working member will sweep an orbital path to burnish a workpiece bore.

Figure 1:
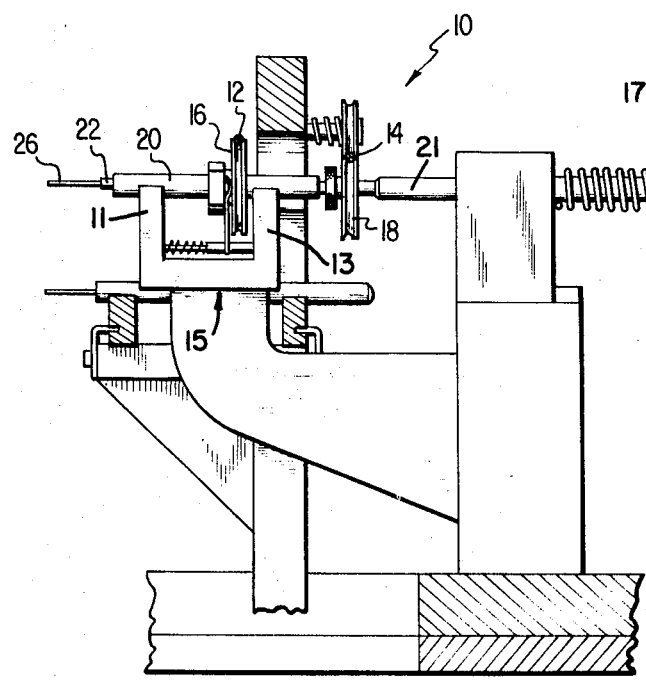
FIG. 1 is a broken elevational view, partly in section, illustrating a compound input tool in working position on the tool changer disclosed in the aforesaid copending application.
Figure 4:
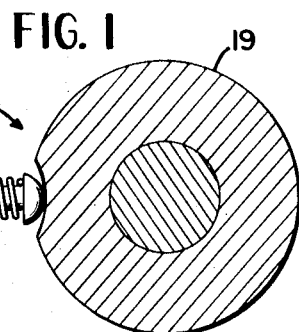
FIG. 4 is a fragmentary front elevational view as seen from the left side of FIG. 1.
Figure 4:
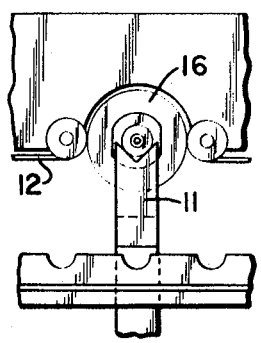

In FIG. 1 is illustrated a portion of the automatic tool changer 10 which is fully described in the aforesaid copending application. The tool changer includes a pair of spaced V tool supports 11, 13 comprising a typical open bearing 15 of the V type and defining an axis of tool rotation. A tool supported in open V bearing 15 may be reciprocated along the axis of rotation by an infeed mechanism 17 comprising a rotary cone cam 19 and cam follower 21. The tool changer further includes fore and aft drive belts 12, 14 for imparting rotation to driving pulleys 16, 18, respectively, secured to telescoping spindles 20, 22. Spindle 22 is mounted eccentrically within spindle 20 in bearings 24 as will be apparent from an inspection of FIGS. 2 and 3. The purpose of this particular construction is to provide a compound rotary input to the burnishing head 26 formed integrally with spindle 22.

Figure 2:
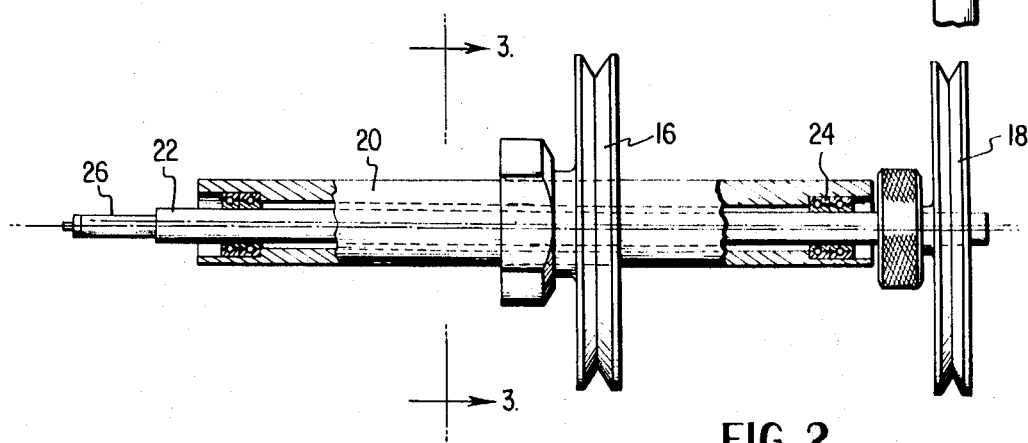
FIG. 2 is a detailed elevational view, with parts in section, of the compound input tool.
Figure 3:
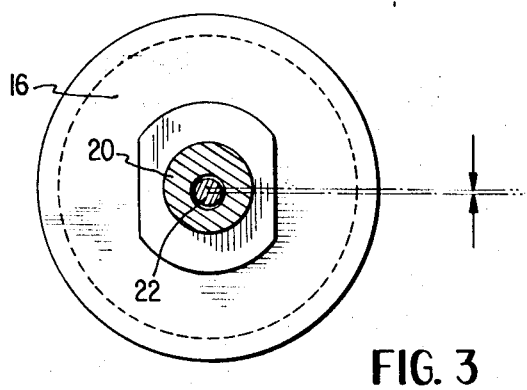
FIG. 3 is a sectional view taken along the line 3—3 of FIG. 2.

With reference to FIGS. 2 and 3, wherein the details of a burnishing tool designed to undergo compound working movement is illustrated, and with further references to FIG. 1 showing the same in working position; it will be appreciated that the front drive belt 12 rotates tool spindle 20 which, because of the eccentric mounting of spindle 22 therein, results in an orbital movement of working, or burnishing, member 26. The drive imparted to rear pulley 18 by the rear drive belt results in rotation of working member 26 while the same is driven in an orbital path by virtue of the rotation of spindle 20 by front belt 12. The offset relationship of the center lines of spindles 20, 22 is indicated by the parallel phantom lines in FIGS. 2 and 3.

Further details regarding the tool changer and drive belt operation as regards the use of the same as working member 26 is operated to burnish a given bore may be had from an inspection of the aforesaid copending application.

I claim:

1. In combination with fixed open bearing means comprising a pair of spaced V tool supports defining an axis of tool rotation; a compound rotary input tool including telescoping spindles having spaced rotational axes, a working member integral with one of said spindles, a drive belt engaging pulley secured to each of said spindles, the other of said spindles having spaced uniform cylindrical bearing surfaces respectively supported on said spaced V tool supports for rotation of said other spindle about said axis of tool rotation, said cylindrical bearing surfaces having an axial extent exceeding that of the respective V tool support whereby the tool may be infed and retracted along said axis of tool rotation, means for infeeding and retracting said tool, and flexible drive belt means for engaging said pulleys.

2. The combination of claim 1 wherein the means for infeeding said tool comprises reciprocal tool infeed means mounted for reciprocal movement along an axis coincident with said axis of tool rotation.

References Cited
UNITED STATES PATENTS

| | | | |
|---|---|---|---|
| 1,316,718 | 9/1919 | Hall | 90—15X |
| 1,430,933 | 10/1922 | Brandt et al. | 90—15X |
| 1,471,412 | 10/1923 | Opfel | 51—90X |
| 2,685,154 | 8/1954 | Ballinger | 51—90 |

GIL WEIDENFELD, Primary Examiner

U.S. Cl. X.R.
51—90; 90—15R